United States Patent
Chai et al.

(10) Patent No.: US 8,630,078 B2
(45) Date of Patent: Jan. 14, 2014

(54) ACTIVE AC INRUSH CURRENT CONTROL (75) Inventors: Huazhen Chai, Caledonia, IL (US); Waleed Said, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 576 days.

(21) Appl. No.: 12/845,967

(22) Filed: Jul. 29, 2010

(65) Prior Publication Data
US 2012/0026636 A1 Feb. 2, 2012

(51) Int. Cl.
*H02H 9/02* (2006.01)
(52) U.S. Cl.
USPC .............................. 361/93.9; 361/58; 361/63
(58) Field of Classification Search
None
See application file for complete search history.

(56) References Cited

U.S. PATENT DOCUMENTS

| | | | |
|---|---|---|---|
| 4,328,459 A | 5/1982 | McLeod, Jr. | |
| 4,396,882 A * | 8/1983 | Kellenbenz | 323/278 |
| 4,625,271 A | 11/1986 | Chetty et al. | |
| 4,633,382 A | 12/1986 | Upadhyay et al. | |
| 5,282,125 A | 1/1994 | Dhyanchand et al. | |
| 5,796,274 A * | 8/1998 | Willis et al. | 327/63 |
| 5,899,411 A | 5/1999 | Latos et al. | |
| 6,107,851 A | 8/2000 | Balakirshnan et al. | |
| 6,225,797 B1 * | 5/2001 | Willis et al. | 323/351 |
| 6,856,526 B2 | 2/2005 | Elek et al. | |
| 7,573,252 B1 | 8/2009 | Griesert | |
| 8,035,938 B2 * | 10/2011 | Divan | 361/58 |
| 2003/0223172 A1 | 12/2003 | Priest | |
| 2006/0132105 A1 | 6/2006 | Prasad et al. | |
| 2006/0227478 A1 | 10/2006 | Herr et al. | |
| 2009/0168278 A1 * | 7/2009 | Landry | 361/56 |

* cited by examiner

*Primary Examiner* — Rexford Barnie
*Assistant Examiner* — Angela Brooks
(74) *Attorney, Agent, or Firm* — Cantor Colburn LLP (57) ABSTRACT

Active inrush current control includes activating a load, the activating causing inrush current to flow, switching a semiconductor switching device to a current limiting state in response to the inrush current flow, the current limiting state being one of at least three states of the semiconductor switching device and the current limiting state dissipating the inrush current, and switching the semiconductor device to a full current flow state in response to the dissipating, the full current flow state not inhibiting current flow.

13 Claims, 10 Drawing Sheets

ACTIVE AC INRUSH CURRENT CONTROL

FIELD OF INVENTION

The subject matter disclosed herein relates generally to the field of alternating current (AC), and more particularly to active control of AC inrush current.

DESCRIPTION OF RELATED ART

When energizing a three phase load such as a frequency converter or motor controller, an initial inrush current may be several times a normal steady state rated current. The inrush current may be caused by charging a direct current (DC) link capacitor and/or energizing an un-energized transformer or filter magnetics. A soft start configuration may be used to limit the inrush current to an acceptable level.

Figure 1:
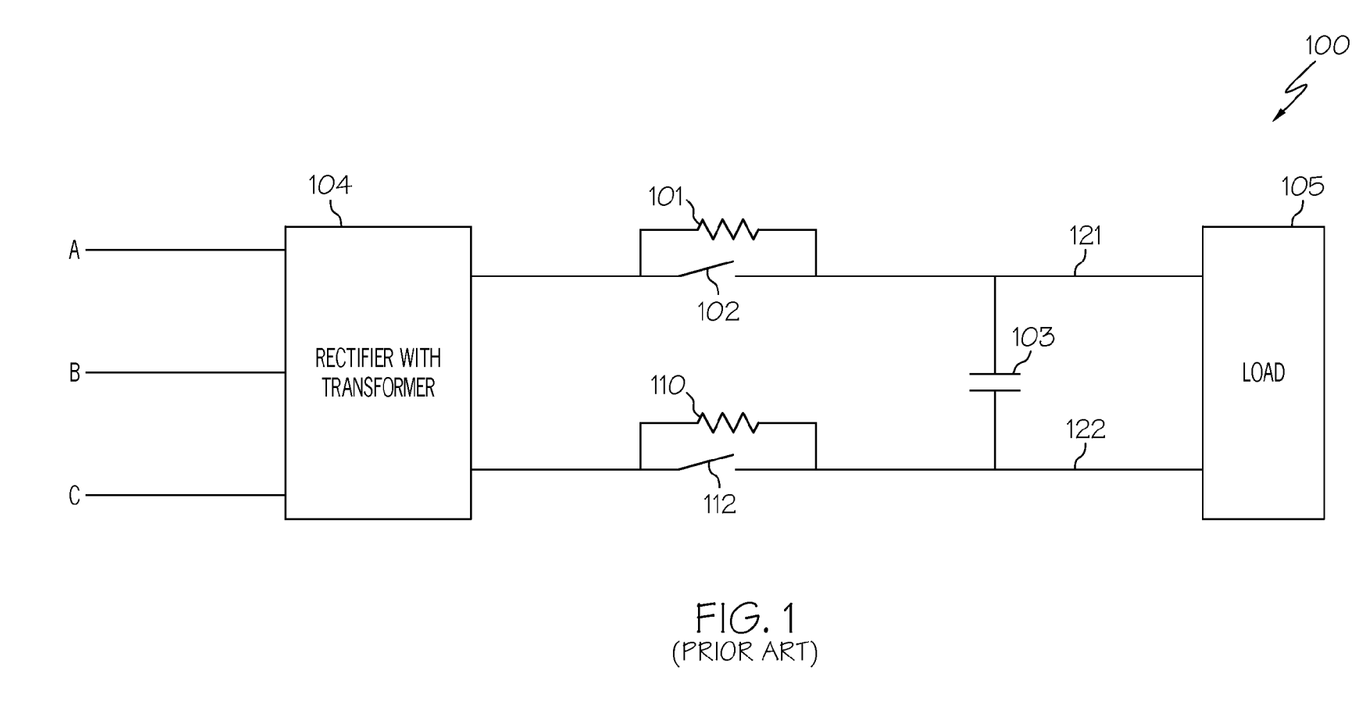
FIG. 1 illustrates a system for AC inrush current control.

Conventional soft start configurations limit the DC link current by placing inrush limiting resistors near a DC link. For example, FIG. 1 depicts such a configuration. The system 100 includes a rectifier 104 in communication with three-phase power denoted by phases A, B, and C. The rectifier 104 may or may not include a transformer. The system 100 further includes resistors 101 and 110 in communication with the rectifier 104 and a load 105 over lines 121 and 122. The system 100 further includes a DC link capacitor 103 coupled across lines 121 and 122.

As illustrated, the system 100 includes bypass switches 102 and 112 which may bypass resistors 101 and 110. In operation, the system 100 limits inrush current caused by charging the DC link capacitor 103. For example, during initial charging of the DC link capacitor 103, the bypass switches 102 and 112 are open, allowing for current to be limited by the resistors 101 and 110. As inrush current dissipates, the bypass switches 102 and 112 are closed, establishing full current flow between the rectifier 104 and the load 105. However, it is apparent that the bypass switching system 100 does not limit inrush current caused by the rectifier 104.

Other implementations of the system 100 may include pulse width modulation of the bypass switches 102 and 112, however such implementations complicate operation of the system 100.

Figure 2:
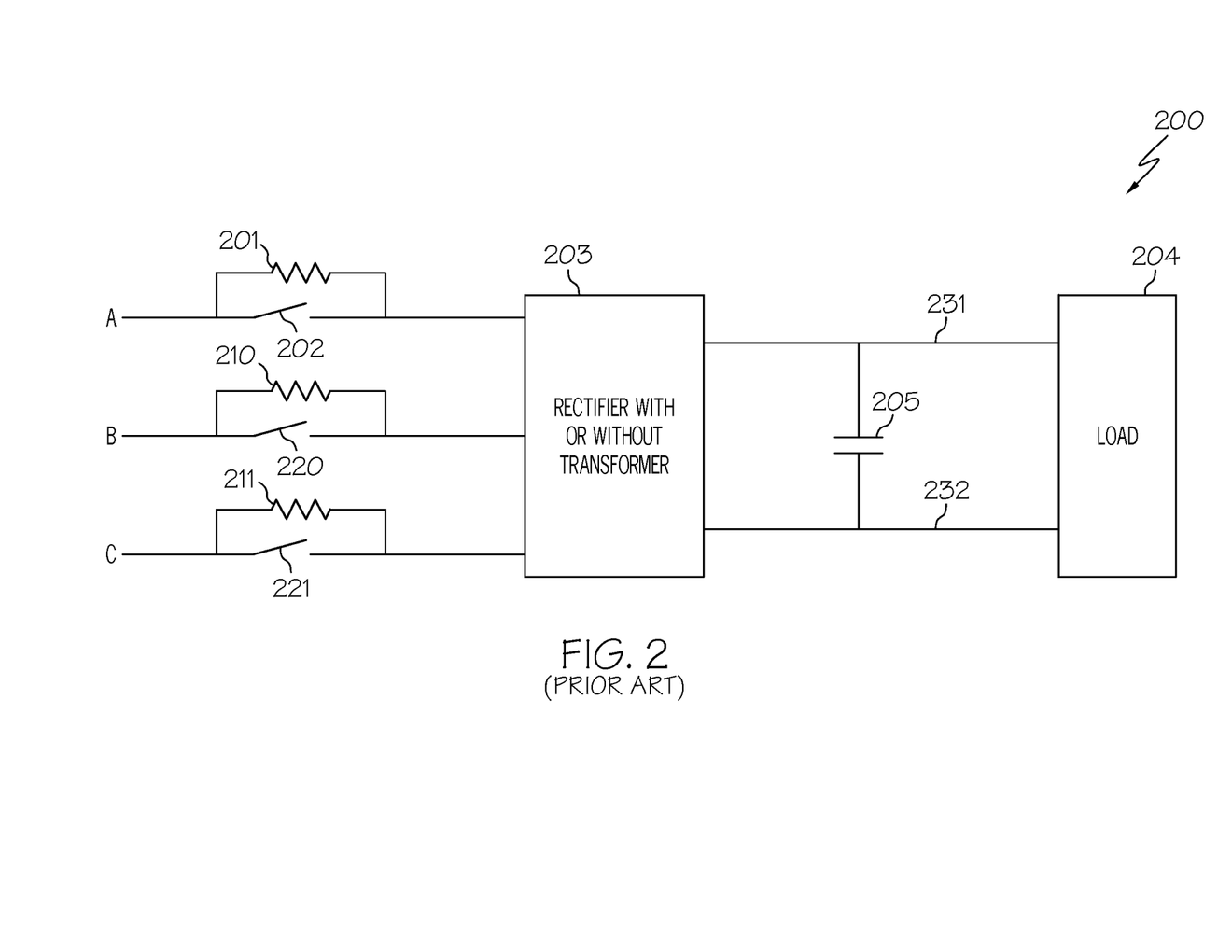
FIG. 2 illustrates a system for AC inrush current control.

A further system for AC inrush current control is illustrated in FIG. 2. As illustrated, the system 200 includes three resistors 201, 210, and 211 in communication with three-phase power denoted by phases A, B, and C. The resistors 201, 210, and 211 are in further communication with rectifier 203. The rectifier 203 may or may not include a transformer. The system 200 further includes bypass switches 202, 220, and 221, configured to bypass the resistors 201, 210, and 211 for full current flow after inrush current has dissipated. The system 200 further includes DC link capacitor 205 coupled across lines 231 and 232 which are in communication with the rectifier 203 and load 204. In the system 200, inrush current may be limited through resistors 201, 210, and 211 when switches 202, 220, and 221 are open. However, it is apparent that inrush current caused by both the rectifier 203 and the DC link capacitor 205 will result in necessarily large resistance values for the resistors 201, 210, and 211.

Thus, the main disadvantages of the systems 100 and 200 include large size and weight of resistors configured to limit inrush current, lack of fault isolation due to bypass switching operations, and additional switches may be required to disrupt current completely from the inrush current limiting resistors if complete fault isolation is desired.

BRIEF SUMMARY

According to one aspect of the invention, a method of active inrush current control includes activating a load, the activating causing inrush current to flow, switching a semiconductor switching device to a current limiting state in response to the inrush current flow, the current limiting state being one of at least three states of the semiconductor switching device and the current limiting state dissipating the inrush current, and switching the semiconductor device to a full current flow state in response to the dissipating, the full current flow state not inhibiting current flow.

According to another aspect of the invention, semiconductor switching device for active inrush current control includes a first transistor disposed and configured to control current flow in at least three states, a first voltage suppression device in communication with the first transistor, a second transistor disposed and configured to control current flow in at least three states, an emitter of the second transistor in communication with an emitter of the first transistor, a second voltage suppression device in communication with the second transistor, and a signaling source in communication with the first transistor and the second transistor, the signaling source disposed and configured to provide different bias voltages to the transistor, the different biasing voltages changing the states of the transistors to a different states of at least three operating states in unison.

According to another aspect of the invention, semiconductor switching device for active inrush current control includes a transistor disposed and configured to control current flow in at least three state, a first diode, a p-type portion of the first diode in communication with a collector of the transistor, a second diode, a p-type portion of the second diode in communication with a collector of the transistor, a third diode, an n-type portion of the third diode in communication with an emitter of the transistor, and a fourth diode, an n-type portion of the fourth diode in communication with an emitter of the transistor.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of a system for active AC inrush current control including semiconductor switching devices are provided and discussed below in detail.

Figure 3:
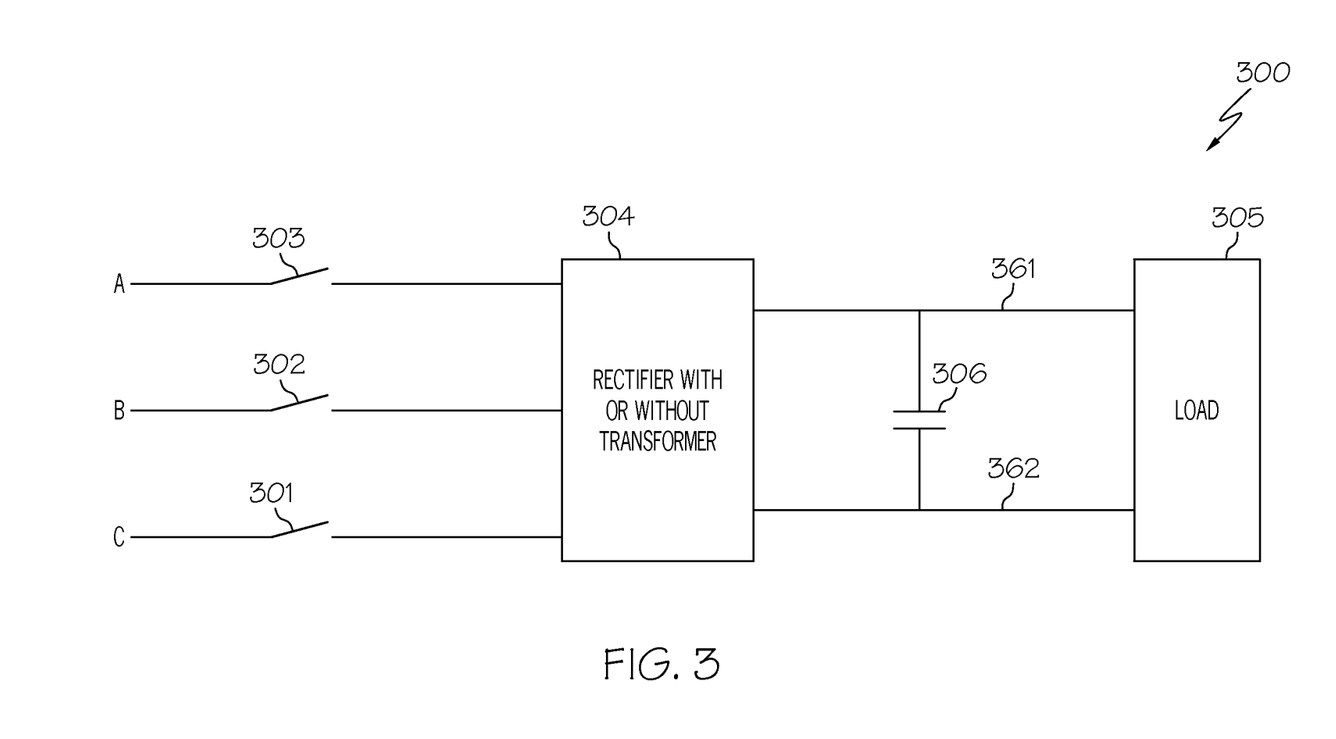
FIG. 3 illustrates a system for active AC inrush current control, according to an example embodiment.

FIG. 3 illustrates a system for active AC inrush current control, according to an example embodiment. The system 300 includes three semiconductor based switching devices, 301, 302, and 303 in communication with three-phase power input lines denoted by A, B, and C. The devices 301-303 may be any suitable semiconductor switching device. Example suitable devices may be based on insulated-gate bipolar transistors (IGBT), field effect transistors (FET), bipolar junction or other junction-based transistors, or any semiconductor based switching device capable of limiting current flow between at least three (3) states.

For example, a first state of current flow may be a state where little or no current can flow through devices 301-303. A second state of current flow may be a state where a limited amount of current can flow through devices 301-303. The second state may be within a linear operating range of the devices 301-303, and may be variably adjusted to limit current flow across the entire linear operating range of the devices 301-303. A third state of current flow may be an on-state where the amount of current flow through devices 301-303 is determined by the load.

The devices 301-303 are in further communication with a rectifier 304, and are disposed to actively alter current flowing between phase input lines A, B, and C, and the rectifier 304. For example, the devices 301-303 may actively alter the current flow through switching between the at least three states noted above.

The system 300 further includes a DC link capacitor 306 coupled across output lines 361 and 362 of the rectifier 304. The output lines 361 and 362 are further coupled to an AC load 305.

If the system 300 is in a state where the devices 301-303 have been off (first state) for a period of time, the rectifier 304 (which includes a transformer) and the DC link capacitor 306 may introduce inrush current when activated, for example, if the devices 301-303 are switched to an on-state. Therefore, the devices 301-303 may be switched to a linear state (second state) where current is limited until the rectifier 304 and the DC link capacitor 306 are charged. Upon charging, the devices 301-303 may be switched to an on-state.

Figure 4A:
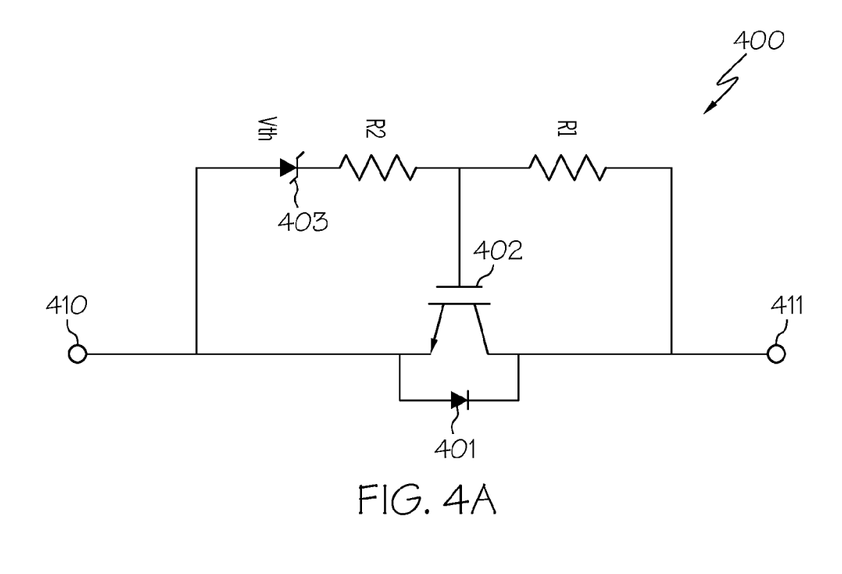
FIG. 4A illustrates a semiconductor switching device for active AC inrush current control, according to an example embodiment.

FIG. 4A illustrates a unidirectional semiconductor switching device 400 for active AC inrush current control, according to an example embodiment. The device 400 includes transistor 402. It should be noted that although an IGBT is illustrated, any suitable transistor capable of operating in at least three (3) states may be used. The device 400 further includes bypass and protection diode 401 coupled across the collector and emitter of the transistor 402. The diode 401 alternates between forward and reverse bias in response to the direction of inrush current flow.

The device 400 further includes signal resistor R1 coupled from input line 411 to the base of transistor 402. The device 400 further includes signal resistor R2 coupled from the gate of transistor 402 to zener diode 403, which is further coupled to output line 410. Zener diode 403 accounts for a gate threshold voltage of the transistor 402, while the signal resistors R1 and R2 set the equivalent resistance seen between a collector and an emitter of the transistor 402.

Figure 4B:
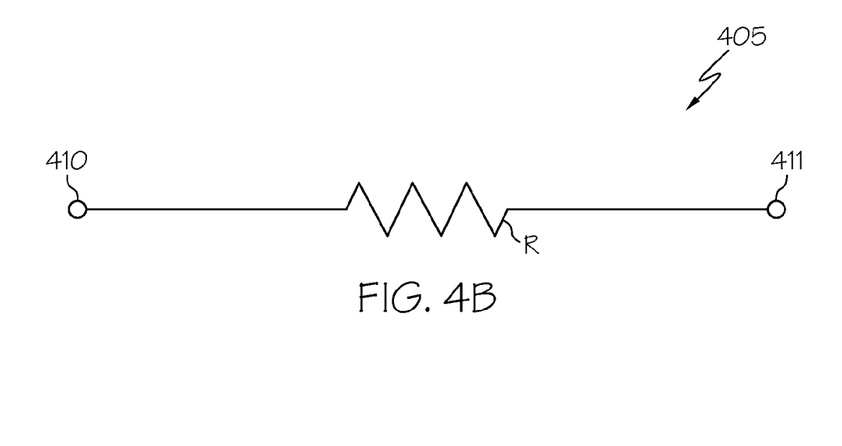
FIG. 4B illustrates an equivalent circuit for a unidirectional semiconductor switching device for active AC inrush current control, according to an example embodiment.

FIG. 4B illustrates an equivalent circuit 405 of the equivalent resistance R seen between the collector and emitter of the transistor 402. The resistance R may be calculated from Equation 1, below:

$$R = R_{th} + (R1 + R2)/(R2 * g) \qquad \text{Equation 1}$$

In Equation 1, $R_{th}$ is calculated as:

$$R_{th} = V_{th}/I_c \qquad \text{Equation 2}$$

In Equation 1, g is calculated as:

$$g = I_c/(V_g - V_{th}) \qquad \text{Equation 3}$$

Where, in Equations 1-3, $I_c$ is a rated load current through the collector of the transistor 402, $V_{th}$ is the gate threshold voltage of the transistor 402, and $V_g$ is the gate voltage of the transistor 402.

Figure 5:
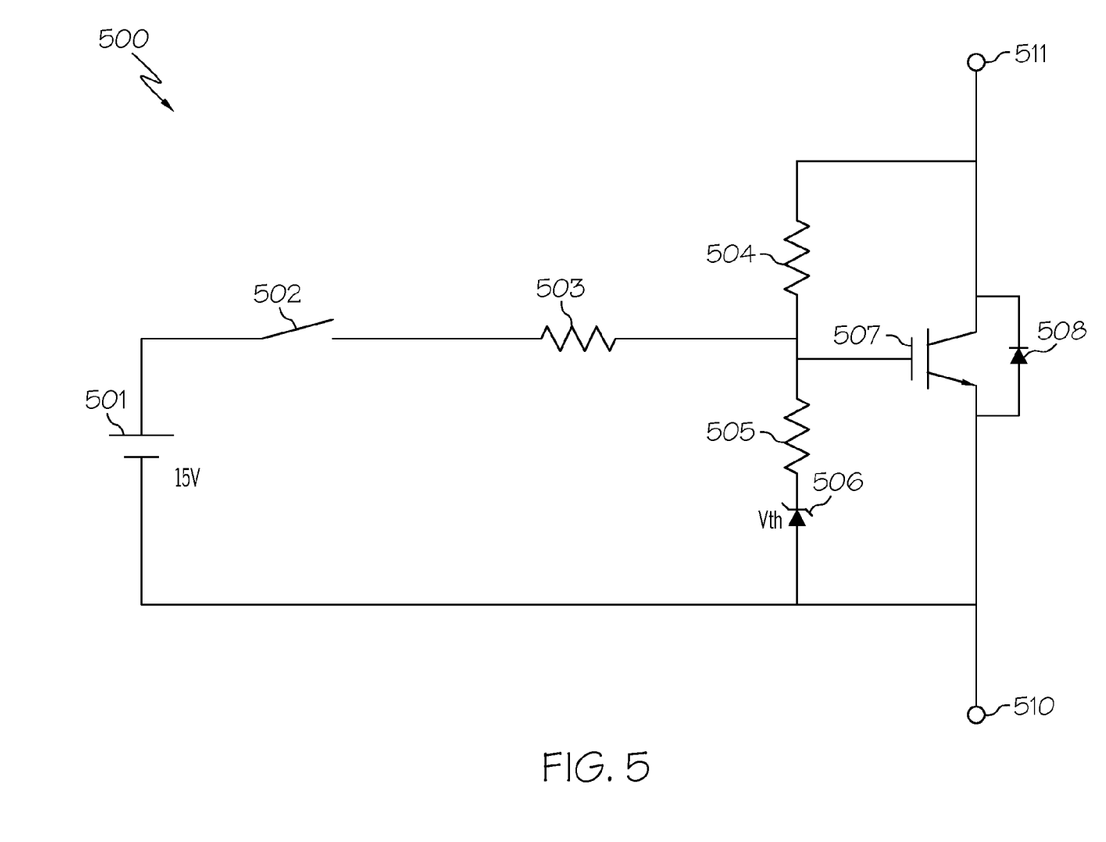
FIG. 5 illustrates a unidirectional semiconductor switching device for active AC inrush current control, according to an example embodiment.

FIG. 5 illustrates a unidirectional semiconductor switching device 500 for active AC inrush current control, according to an example embodiment. The device 500 includes transistor 507, bypass and protection diode 508, signal resistor 504, signal resistor 505, and zener diode 506 which are substantially similar in both structure and operation to transistor 402, diode 401, signal resistor R1, signal resistor R2, and zener diode 403. Thus, exhaustive description of these elements is omitted herein for the sake of brevity.

The device 500 further includes gate drive signal 501. Gate drive signal 501 is modeled as a voltage source here for simplicity and illustrative purposes but it should be apparent that the illustrated source 501 may be any suitable voltage signal source producing sufficient voltage to actively switch transistor 507 between at least three states as described above.

The device 500 further includes signal switch 502 in communication with the source 501, and resistor 503 between the signal switch 502 and the gate of transistor 507. The signal switch 502 may be any suitable switch capable of disrupting voltage/current between the source 501 and the transistor 507. If the signal switch 502 is open the semiconductor device 500 is in active resistance inrush current control mode, or a second/linear state. If the signal switch 500 is closed the semiconductor device 500 is in a bypass mode, or a third/open state. If the gate drive signal 501/source 501 is less than or equal to about zero (0) volts, the semiconductor device 500 is in an off mode, or first/off state, fully disrupting current flow from input line 511 and output line 510.

Figure 6:
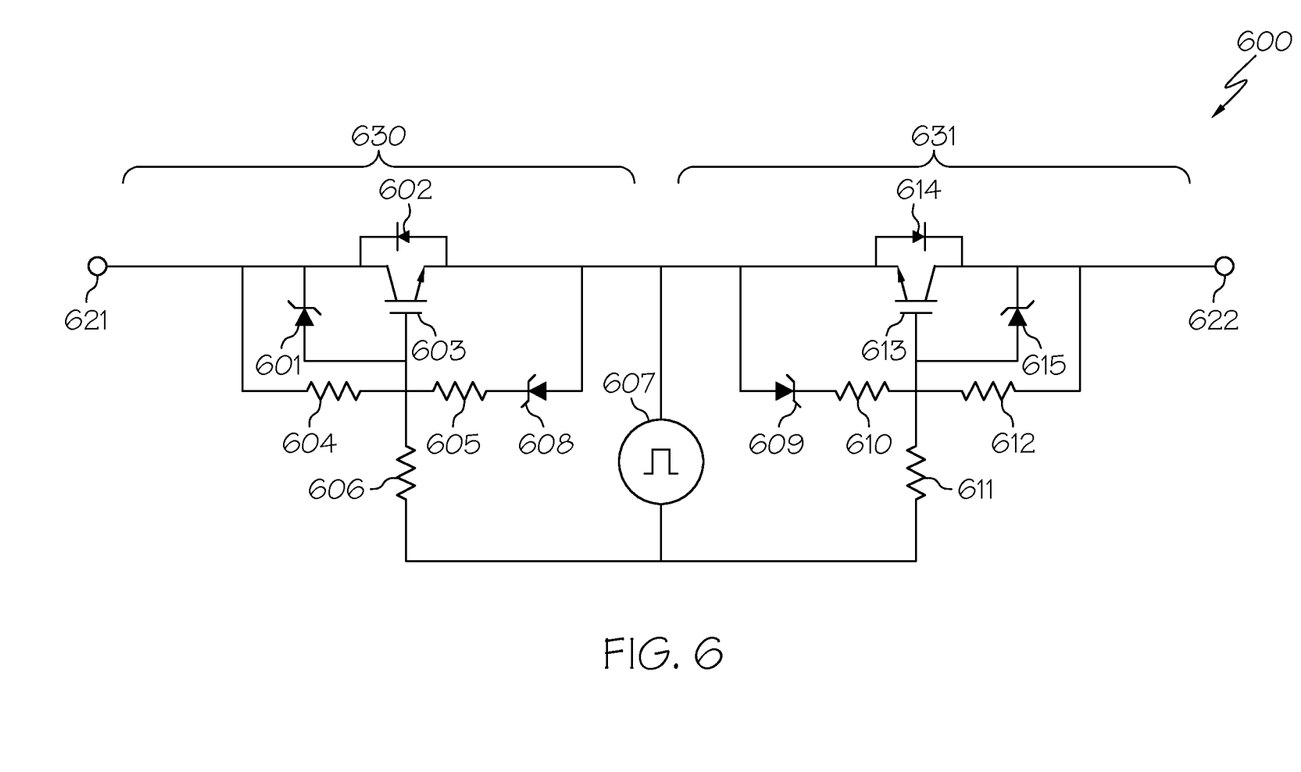
FIG. 6 illustrates a bidirectional semiconductor switching device for active AC inrush current control, according to an example embodiment.

FIG. 6 illustrates a bidirectional semiconductor device for active AC inrush current control, according to an example embodiment. The device 600 includes two unidirectional semiconductor switching devices somewhat similar to device 500. For example, device 630 includes bypass and protection diode 602 coupled across transistor 603, and further includes signal resistors 604-605, resistor 606, and zener diode 608. The operation and structure of these devices is somewhat similar to those described with reference to FIGS. 4-5.

For example, the zener diode 608 provides a gate threshold voltage for the transistor 603, which is coupled to the zener diode 608 through resistor 605, at the base of transistor 603. Signal resistor 604 is also coupled to the base of transistor 603, and in communication with output line 621. The device 630 is also coupled to a gate driving signal source 607 through resistor 606. Additionally, an active voltage clamping device 601 is coupled from base to collector of the transistor 603. The clamping device 601 is configured to prevent damage from system inductance current induced voltage.

Thus, the device 630 may operate in one of at least three states as described above with reference to FIG. 5.

As further illustrated, the device 600 may include a second unidirectional semiconductor switching device 631, configured and disposed to switch between one of at least three states and conducting (or limiting/disrupting) current in an opposite direction from the device 630. The second device 631 may be structurally and operational similar to device 630, including zener diode 609, resistors 610, 611, 612, transistor 613, protection diode 614, and active voltage clamping device 615 coupled to line 622, and thus exhaustive description is omitted herein for the sake of brevity.

Figure 7:
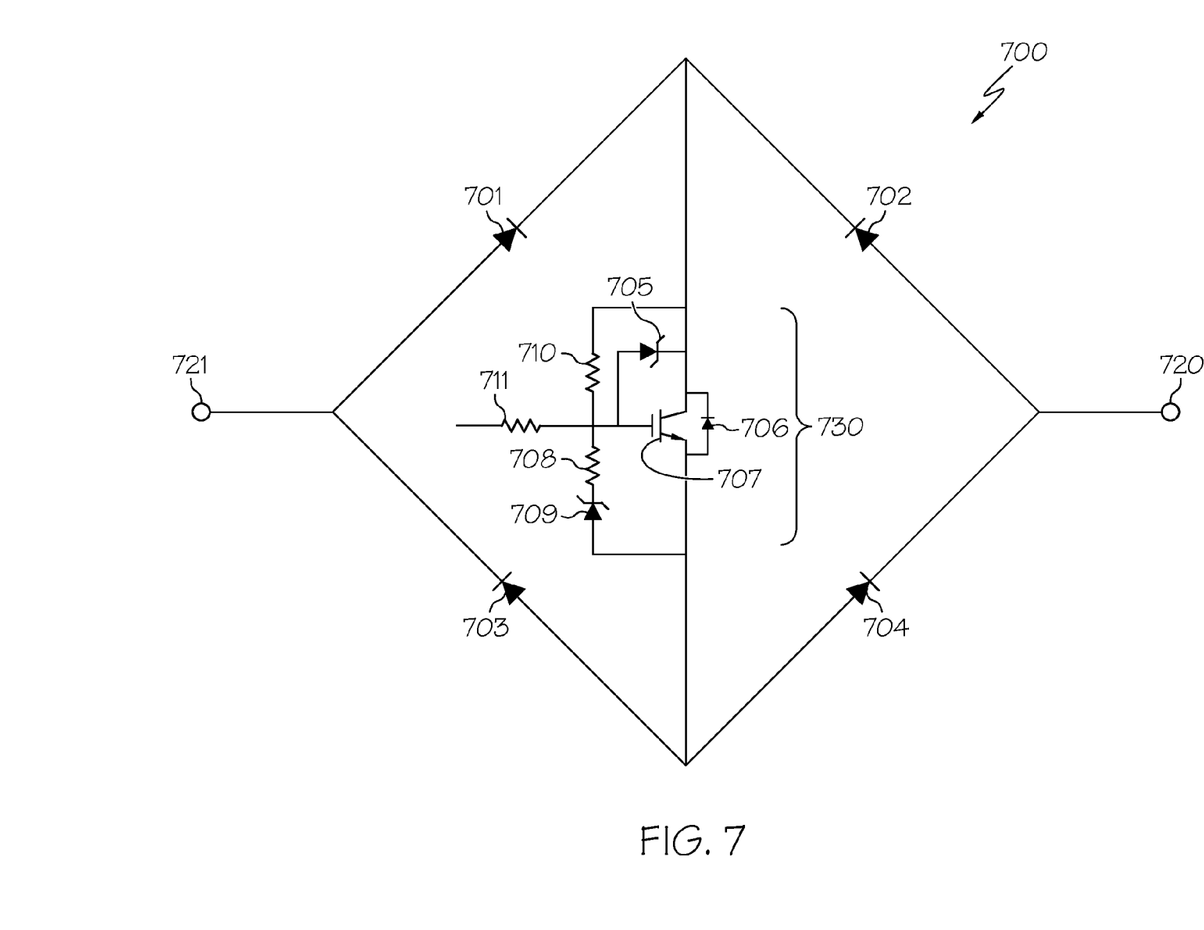
FIG. 7 illustrates a bidirectional semiconductor switching device for active inrush current control, according to an example embodiment.

FIG. 7 illustrates a bidirectional semiconductor device 700 for active inrush current control, according to an example embodiment. As illustrated, the device 700 includes a unidirectional semiconductor switching device 730 which is somewhat similar to unidirectional semiconductor switching device 630. The device 730 includes a transistor 707, voltage clamping zener diode 705, bypass and protection diode 706, gate threshold diode 709, signal resistors 708 and 710, and resistor 711. Although not specifically illustrated, it should be understood that a signal source may be in communication with the resistor 711 to allow for three-state operation of the device 730.

As further illustrated, the entire bidirectional device 700 includes a plurality of diodes 701, 702, 703, and 704 in operative communication with the device 730, and input and output lines 720 and 721. As illustrated, a p-type portion of the diode 701 is in communication with a collector of the transistor 707. Further, a p-type portion of the diode 702 is in communication with the collector of the transistor 707. Further, an n-type portion of the diode 703 is in communication with an emitter of the transistor 707. Finally, an n-type portion of the diode 704 is in communication with the emitter of the transistor 707.

As alternating current is applied, the diodes 701-704 switch from being forward to reverse biased, and vice versa. For example, as a waveform from alternating current changes from negative to positive values, the diode 702 and 703 are forward biased, allowing for current to be controlled at the device 730 as described above. As a waveform of alternating current changes from negative to positive values, the diodes 701 and 704 are forward biased, allowing for current to be controlled at the device 730 as described above. In this manner, the entire device 700 allows for bidirectional control of current albeit using only a single unidirectional device 730.

Although unidirectional semiconductor switching devices are described above with inclusion of voltage clamping diodes, it should be understood that other forms of voltage control/suppression may be established. For example, FIGS. 8-9 depict bidirectional semiconductor switching devices using transient voltage suppression diodes (transorbs).

Figure 8:
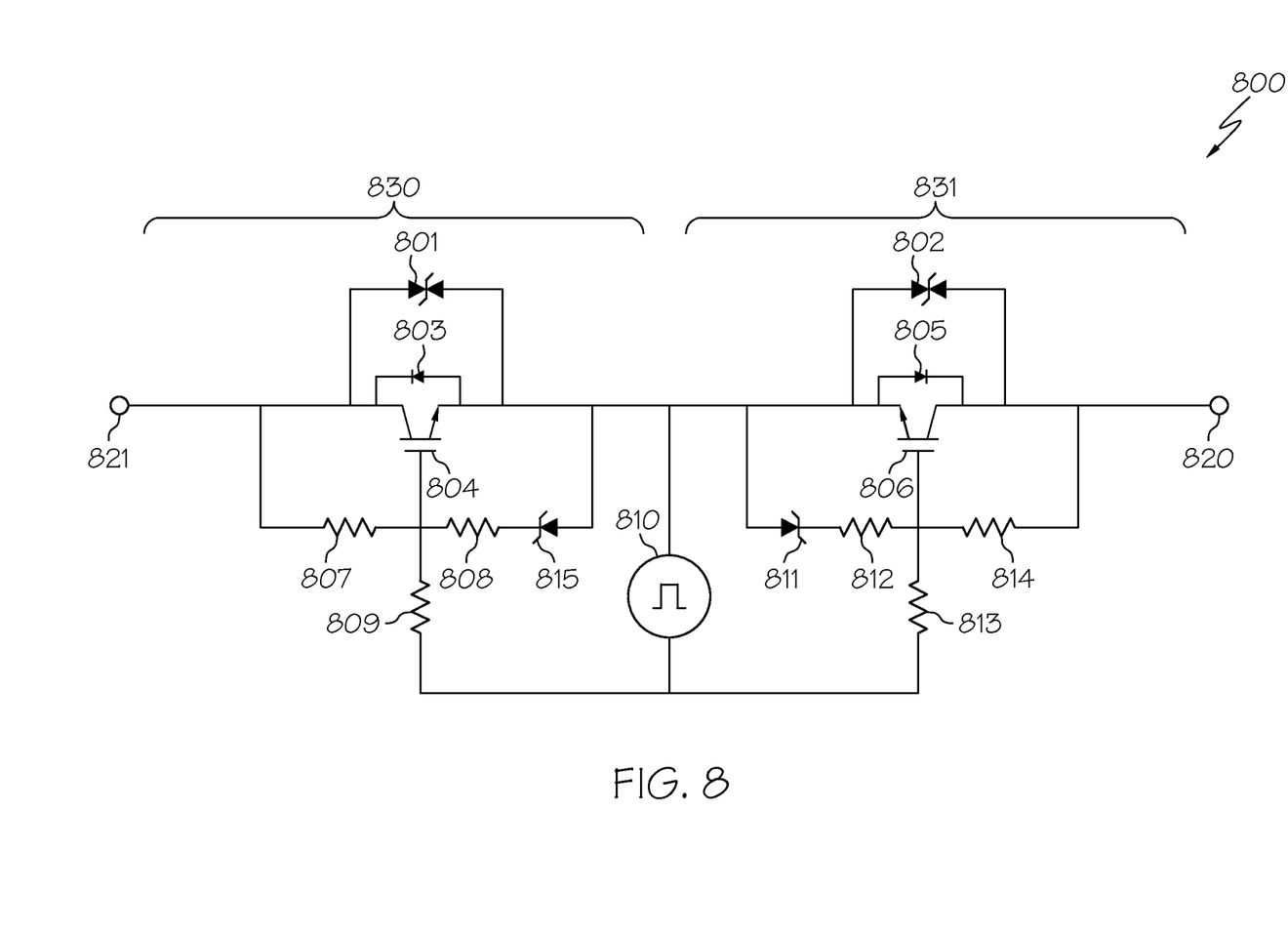
FIG. 8 illustrates a bidirectional semiconductor switching device for active AC inrush current control, according to an example embodiment.
Figure 9:
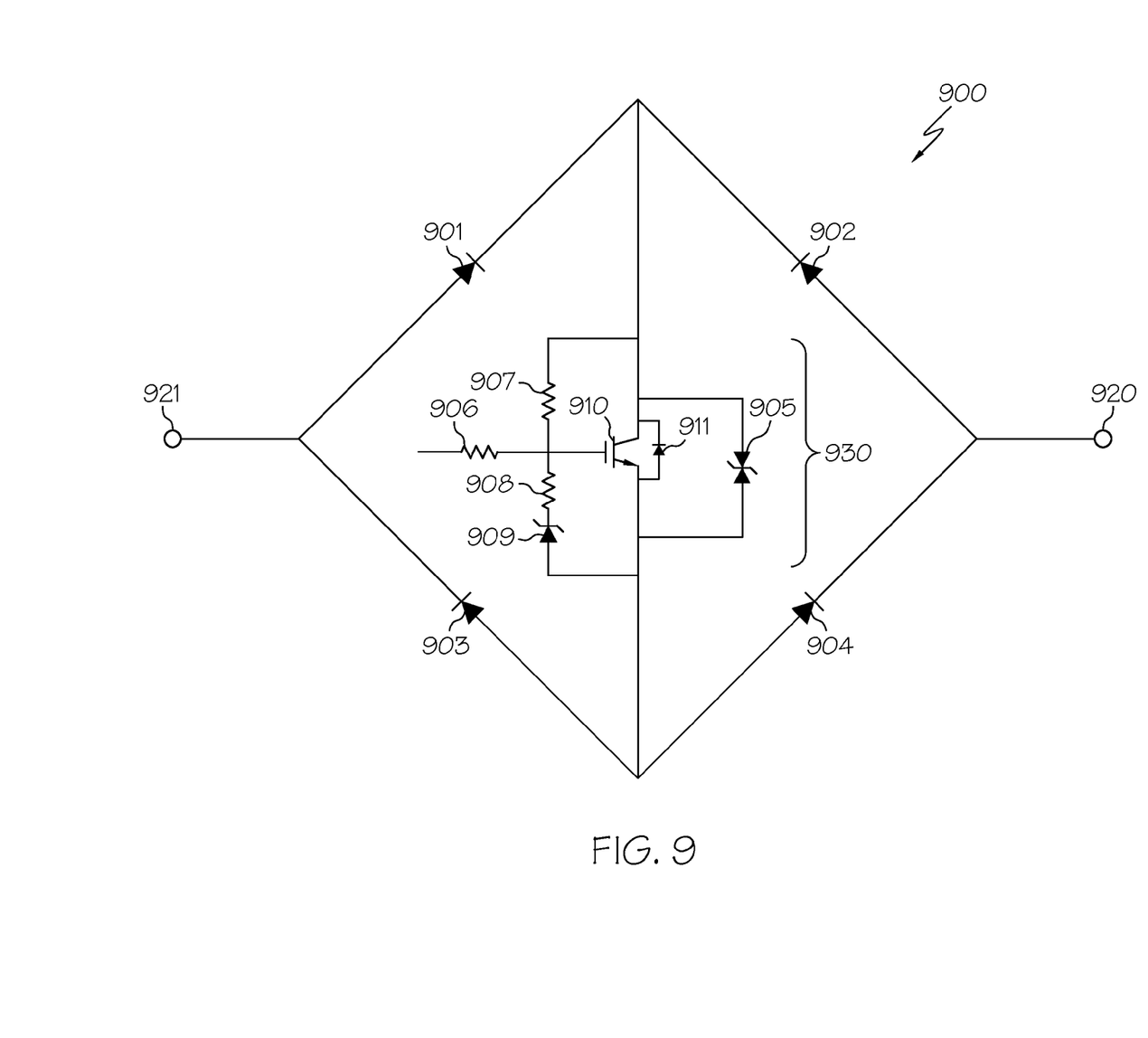
FIG. 9 illustrates a bidirectional semiconductor switching device for active AC inrush current control, according to an example embodiment.

FIG. 8 illustrates a bidirectional semiconductor device 800 for active AC inrush current control, according to an example embodiment. As illustrated, the device 800 includes two unidirectional semiconductor switching devices 830 and 831. The unidirectional devices 830 and 831 are somewhat similar to devices 630 and 631, but include transorbs 801 and 802 for voltage suppression. Thus, the bidirectional device 800 is structurally and operationally similar to the device 600.

For example, the unidirectional device 830 includes transistor 804, diode 803, gate threshold voltage diode 815, signal resistors 807 and 808, and resistor 809. Further, the device 830 includes signal source 810 providing for three-state operation of the device 830.

The unidirectional device 831 includes transistor 806, diode 805, gate threshold voltage diode 811, signal resistors 812 and 814, and resistor 813. Through unidirectional operation of both the devices 830 and 831, the entire device 800 provides bidirectional control of current provided at input and output lines 820 and 821.

FIG. 9 illustrates a bidirectional semiconductor device 900 for active AC inrush current control, according to an example embodiment. The device 900 is similar to the device 700, with the inclusion of a single unidirectional device 930. The device 930 is somewhat similar to unidirectional semiconductor switching device 830. The device 930 includes transorb 905, diode 911, transistor 910, gate threshold diode 909, signal resistors 907 and 908, and resistor 906. Although not specifically illustrated, it should be understood that a signal source may be in communication with the resistor 906 to allow for three-state operation of the device 930.

As further illustrated, the entire bidirectional device 900 includes a plurality of diodes 901, 902, 903, and 904 in operative communication with the device 930, and input and output lines 920 and 921. As illustrated, a p-type portion of the diode 901 is in communication with a collector of the transistor 910. Further, a p-type portion of the diode 902 is in communication with the collector of the transistor 910. Further, an n-type portion of the diode 903 is in communication with an emitter of the transistor 910. Finally, an n-type portion of the diode 904 is in communication with the emitter of the transistor 910.

As alternating current is applied, the diodes 901-904 switch from being forward to reverse biased, and vice versa. For example, as a waveform from alternating current changes from negative to positive values, the diode 902 and 903 are forward biased, allowing for current to be controlled at the device 930 as described above. As a waveform of alternating current changes from negative to positive values, the diodes 901 and 904 are forward biased, allowing for current to be controlled at the device 930 as described above. In this manner, the entire device 900 allows for bidirectional control of current albeit using only a single unidirectional device 930.

Therefore, as described in detail above, example embodiments include a plurality of unidirectional semiconductor switching devices allowing for active current control in at least three different operating states. Each of the plurality of unidirectional devices may be configured in a bidirectional semiconductor switching device through intelligent application of forward-reverse biased diodes, or in compliment to another unidirectional device for overall bidirectional control of current. Example embodiments further include methods of active AC inrush current control.

Figure 10:
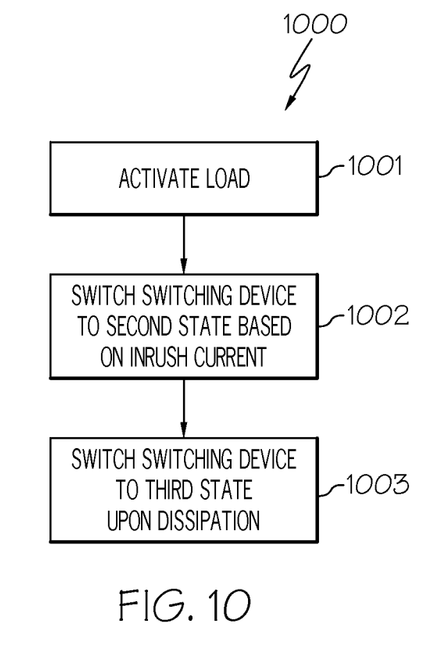
FIG. 10 illustrates a method of active AC inrush current control, according to an example embodiment.

FIG. 10 illustrates a method 1000 of active inrush current control, according to an example embodiment.

The method 1000 includes activating a load at block 1001. For example, activating a load may include applying power to a transformer/rectifier in communication with the load.

The method 1000 further includes switching a semiconductor switching device's operating state in response to inrush current at block 1002. For example, when the load is activated, the transformer/rectifier and other devices in communication with the transformer/rectifier may cause inrush current to flow while charging. Thus, a semiconductor switching device may be switched to a current limiting state. For example, the semiconductor switching device may be any of the devices described above. The current limiting state may be a second state as described above.

The method 1000 further includes switching the semiconductor switching device to a non-inhibiting state at block 1003. For example, as the inrush current dissipates, the semiconductor switching device may be switched to a state where current flow is not inhibited by the switching device. The state may be a third state as described above.

Thus example embodiments of the present invention further provide methods of active inrush current control.

The technical effects of example embodiments include relatively decreased DC link and transformer based AC inrush current. Through operation of a semiconductor switching device in one of at least three states, active control of inrush current is possible with relatively little change to control systems.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of active inrush current control, comprising:
    activating a load, the activating causing inrush current to flow;
    switching a semiconductor switching device to a current limiting state in response to the inrush current flow, the current limiting state being one of at least three states of the semiconductor switching device and the current limiting state dissipating the inrush current; and
    switching the semiconductor switching device to a full current flow state in response to the dissipating, the full current flow state not inhibiting current flow,
    wherein the semiconductor switching device includes two transistors disposed and configured to control current flow in the at least three states, and
    wherein the transistors operate within a same state of the at least three states.

2. The method of claim 1, wherein:
    a first state of the at least three states blocks current flow;
    a second state of the at least three states is the current limiting state; and
    a third state of the at least three states is the full current flow state.

3. The method of claim 2, wherein the current limiting state is a variable state variably limiting current flow.

4. The method of claim 2, wherein the current limiting state is a linear operating state of at least one transistor of the semiconductor switching device.

5. The method of claim 1, further comprising switching the semiconductor switching device to a current blocking state, the current blocking state deactivating the load.

6. The method of claim 1, applying a bias voltage to a transistor of the semiconductor switching device to switch states of the semiconductor switching device.

7. The method of claim 6, wherein the bias voltage is one of at least three voltage levels.

8. The method of claim 1, further comprising a DC link capacitor and a transformer in communication with the load, the DC link capacitor and the transformer providing the inrush current.

9. A semiconductor switching device for active inrush current control, comprising:
    a first transistor disposed and configured to control current flow in at least three states;
    a first voltage suppression device in communication with the first transistor;
    a second transistor disposed and configured to control current flow in at least three states, an emitter of the second transistor in communication with an emitter of the first transistor;
    a second voltage suppression device in communication with the second transistor; and
    a signaling source in communication with the first transistor and the second transistor, the signaling source disposed and configured to provide different bias voltages to the transistors, the different biasing voltages changing the states of the transistors to a different states of at least three operating states in unison.

10. The semiconductor switching device of claim 9, wherein the first and second voltage suppression devices are transient voltage suppression diodes or zener diodes.

11. The semiconductor switching device of claim 9, wherein the first and second transistors are insulated-gate bipolar transistors or field-effect transistors.

12. The semiconductor switching device of claim 9, further comprising:
    a first bypass and protection diode coupled across the emitter and a collector of the first transistor; and
    a second bypass and protection diode coupled across the emitter and a collector of the second transistor; wherein the first and second bypass and protection diodes alternate between forward and reverse bias in response to a direction of inrush current flow.

13. The semiconductor switching device of claim 9, wherein:
    a first state of the at least three states blocks current flow;
    a second state of the at least three states limits current flow; and
    a third state of the at least three states does not inhibit current flow.

* * * * *